US010526754B2

(12) United States Patent
Fox et al.

(10) Patent No.: US 10,526,754 B2
(45) Date of Patent: Jan. 7, 2020

(54) MATERIAL SPREADER FOR A HEAVY DUTY VEHICLE

(71) Applicant: Swenson Spreader, LLC, Lindenwood, IL (US)

(72) Inventors: Troy Fox, Lindenwood, IL (US); Tom Rasmussen, Lindenwood, IL (US); Bill Hintzsche, Lindenwood, IL (US); Bob Schaefer, Lindenwood, IL (US)

(73) Assignee: Swenson Spreader, LLC, Lindenwood, IL (US)

( * ) Notice: Subject to any disclaimer, the term of this patent is extended or adjusted under 35 U.S.C. 154(b) by 0 days.

(21) Appl. No.: 15/922,475

(22) Filed: Mar. 15, 2018

(65) Prior Publication Data

US 2018/0298568 A1    Oct. 18, 2018

Related U.S. Application Data

(60) Provisional application No. 62/472,328, filed on Mar. 16, 2017.

(51) Int. Cl.
*E01C 19/20* (2006.01)
*E01H 10/00* (2006.01)
*B65G 23/44* (2006.01)

(52) U.S. Cl.
CPC ...... *E01C 19/2045* (2013.01); *E01C 19/2005* (2013.01); *E01H 10/007* (2013.01); *B65G 23/44* (2013.01); *E01C 2019/2075* (2013.01)

(58) Field of Classification Search
CPC . E01H 10/007; E01C 19/2005; E01C 19/201; E01C 19/203; E01C 19/2045; E01C 2019/2055; E01C 2019/207; E01C 2019/2075; E01C 2019/208; A01C 17/00; A01C 17/001; B65G 23/44
See application file for complete search history.

(56) References Cited

U.S. PATENT DOCUMENTS

| 2,858,011 A | 10/1958 | Wahl |
| 3,322,429 A | 5/1967 | Cervelli |
| 3,559,893 A | 2/1971 | Gruben |
| 3,559,894 A | 2/1971 | Murray et al. |
| 3,782,634 A | 1/1974 | Herman |

(Continued)

FOREIGN PATENT DOCUMENTS

| CA | 2217941 | 4/1999 |
| CA | 2355143 | 2/2003 |

OTHER PUBLICATIONS

Monroe Truck Equipment, MSPV V-Box, 3-97, p. 1 of 2.

(Continued)

*Primary Examiner* — Darren W Gorman
(74) *Attorney, Agent, or Firm* — Emerson, Thomson & Bennett, LLC; Roger D. Emerson (57) ABSTRACT

A material spreader for a heavy duty vehicle is provided having a hopper capable of carrying and distributing a particulate material, a longitudinally extending conveyor to move material within the hopper, a pivotably attached discharge chute and optionally, one or more liquid storage tanks secured to the exterior of the hopper by a securement system comprise a series of one or more straps connected on each end to a c-shaped cross member affixed to the vehicle or hopper body.

7 Claims, 15 Drawing Sheets

(56) References Cited

U.S. PATENT DOCUMENTS

| | | | |
|---|---|---|---|
| 4,030,641 A | 6/1977 | Bailey et al. | |
| 4,157,150 A | 6/1979 | Hetrick | |
| 4,166,581 A | 9/1979 | Hetrick | |
| 4,169,559 A * | 10/1979 | McKee | E01C 19/203 239/672 |
| 4,261,520 A | 4/1981 | Hetrick | |
| 4,316,581 A | 2/1982 | Van Der Lely et al. | |
| 5,618,002 A | 4/1997 | Cervelli et al. | |
| 5,669,531 A | 9/1997 | Hagemeyer | |
| 5,772,389 A | 6/1998 | Feller | |
| 5,842,649 A | 12/1998 | Beck et al. | |
| 5,931,393 A | 8/1999 | Alsip et al. | |
| 5,947,391 A | 9/1999 | Beck et al. | |
| 6,089,478 A | 7/2000 | Truan et al. | |
| 6,123,276 A | 9/2000 | Ungerer et al. | |
| 6,179,230 B1 | 1/2001 | Geroux et al. | |
| 6,220,532 B1 | 4/2001 | Manon et al. | |
| 6,354,786 B1 | 3/2002 | Feller | |
| 6,364,598 B1 | 4/2002 | Vickers et al. | |
| 6,394,735 B2 | 5/2002 | Hollinrake et al. | |
| 6,398,137 B1 | 6/2002 | Manon et al. | |
| 6,401,983 B1 | 6/2002 | McDonald et al. | |
| 6,422,490 B1 | 7/2002 | Truan et al. | |
| 6,446,879 B1 | 9/2002 | Kime | |
| 6,698,997 B2 | 3/2004 | Arne et al. | |
| 6,715,703 B2 | 4/2004 | Kost et al. | |
| 6,722,590 B2 | 4/2004 | Kost et al. | |
| 6,786,435 B2 | 9/2004 | Mishra | |
| 6,881,022 B2 | 4/2005 | Feller | |
| 6,932,287 B2 | 8/2005 | Kost | |
| 6,978,952 B2 | 12/2005 | Kost et al. | |
| 7,370,818 B2 | 5/2008 | Ward et al. | |
| 7,481,384 B2 | 1/2009 | Truan et al. | |
| 7,540,436 B2 | 6/2009 | Truan et al. | |
| 8,185,276 B2 | 5/2012 | Buckbee et al. | |
| 8,511,589 B2 | 8/2013 | Richardson | |
| 9,085,862 B2 | 7/2015 | Norkus et al. | |
| 9,085,863 B2 | 7/2015 | Norkus et al. | |
| 9,371,621 B2 | 6/2016 | Norkus et al. | |
| 9,475,072 B2 | 10/2016 | Norkus et al. | |
| 9,562,333 B2 | 2/2017 | Sandler et al. | |
| 2003/0006320 A1 | 1/2003 | Swift et al. | |
| 2005/0184174 A1 | 8/2005 | Bailey et al. | |
| 2006/0266853 A1 | 11/2006 | Gamble, II et al. | |
| 2007/0069044 A1 | 3/2007 | Sandler et al. | |
| 2007/0262179 A1 | 11/2007 | Larsen et al. | |
| 2009/0032624 A1 | 2/2009 | Truan et al. | |
| 2014/0231553 A1 * | 8/2014 | Truan | E01C 19/203 239/661 |

OTHER PUBLICATIONS

Monroe Truck Equipment, MSPV V-Box, 3-94, p. 2 of 2.
Monroe Truck Equipment, Hopper WLDNT,AUG MSPV, 96-50-32, Part No. 0031093, Oct. 2, 2017.

* cited by examiner

MATERIAL SPREADER FOR A HEAVY DUTY VEHICLE

This application claims the benefit of U.S. Provisional Patent Application No. 62/472,328 entitled MATERIAL SPREADER FOR A HEAVY DUTY VEHICLE filed on Mar. 16, 2017, and U.S. Provisional Patent Application No. 62/471,847 entitled MATERIAL SPREADER FOR A VEHICLE filed on Mar. 15, 2017, the entirety of which are incorporated herein by reference.

TECHNICAL FIELD

This disclosure relates to a material spreader for use with an associated vehicle. More specifically, the present disclosure relates to a material spreader for use in the rear of a truck, wherein the spreader is utilized to broadcast particulate and/or liquid materials over a surface such as a roadway or parking lot. More particularly, the present disclosure relates to spreaders for use on vehicles having a gross vehicle weight ("GVW") in excess of 20,000 lbs.

BACKGROUND

Heavy vehicles, in excess of 20,000 lb GVW are commonly used in clearing roadways and other surfaces of snow and ice. Most of these vehicles are used by municipalities or large private entities with a need to clear a large area, such as a highway, airport, or other similar structure. Often these vehicles utilize a material spreader to treat these surfaces to prevent future buildup of additional snow and ice in addition to snow and ice removal equipment. Most often, the material spreader is used to broadcast road salt, sand, cinders, or a combination of one or more of these materials over the newly plowed or cleared surface.

Current spreaders, particularly those used in these heavy duty trucks, tend to incorporate features such as a hopper having sloped or angled interior sides which direct material down to a central, longitudinal conveyor, which in turn drives the material to the rear of the spreader. Here it exits the hopper and falls through a chute onto a horizontally oriented spinner, which broadcasts the material outward to cover an area of the ground surface significantly wider than the vehicle or material spreader itself.

These prior art systems are known to be effective in evenly spreading material over a large surface in a short period of time, and often at high speeds. Despite their known effectiveness, many of these systems still suffer from defects, including the need for regular maintenance such as lubrication and replacement of wearable parts. Furthermore, without proper maintenance, these systems are prone to clogging or breaking, as well as decreased flow rate of material and inconsistent distribution of materials.

Other known devices spread liquid material, including de-icing liquids, brines, or other chemical applications. It is common to combine the features of a particulate material spreader with a liquid material spreader to allow flexibility in application of these materials depending on the specifics of a particular surface or job. Systems incorporating both a liquid and particulate material spreader suffer the same defects listed above, but the inclusion of spreaders for both material types creates limited space for each which in turn reduces load capacity. Lack of space on the rear of a vehicle can also cause the operator to eliminate desired features, additional components, and/or safety equipment from the vehicle.

Finally, given that the industry predominately uses salt and brine mixtures in these material spreaders, corrosion from standing salt and/or salt spray tends to pose additional problems.

What is needed is a spreader which requires less maintenance and is less susceptible to corrosion, is capable of delivering multiple material types, and maximizes the usable space on the rear of the vehicle, while maintaining flexible equipment options and not reducing the load capacity or safety of the spreader. Further advantages to such a system include favorable changes to the ease and cost of manufacturing as well as less down time due to maintenance and/or breakage.

DESCRIPTION OF THE DRAWINGS

The disclosure may take physical form in certain parts and arrangement of parts, embodiments of which will be described in detail in this specification and illustrated in the accompanying drawings which form a part hereof and wherein.

DETAILED DESCRIPTION

With reference to the FIGS., a material spreader is provided having a hopper (shown generally in FIG. 16) capable of carrying and distributing a particulate material, a longitudinally extending conveyor to move material within the hopper, a discharge chute, and a spinner capable of broadcasting the particulate material across a surface substantially wider than the spreader itself. The material spreader can also include a liquid material storage bin and liquid dispenser to disperse a liquid material over a surface surrounding and/or behind the vehicle.

Figure 10:
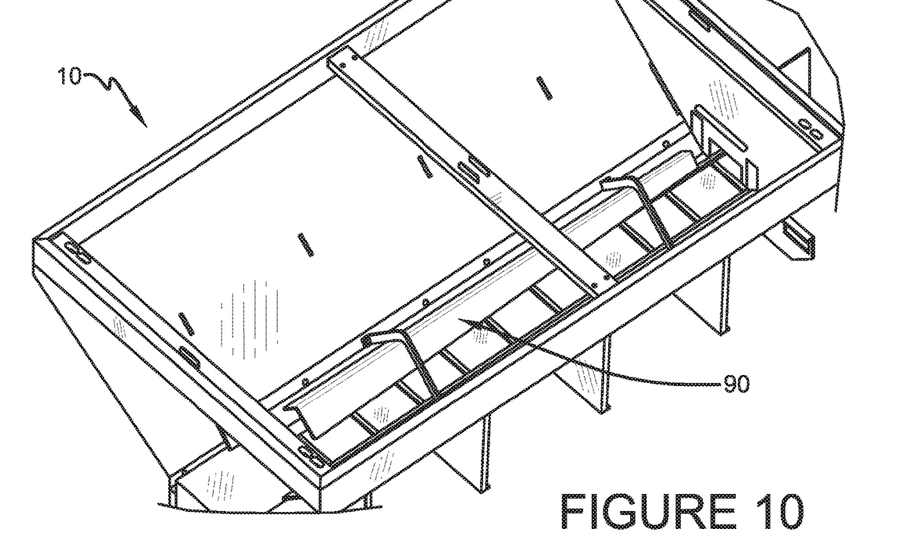
FIG. 10 is a view of the hopper.
Figure 16:
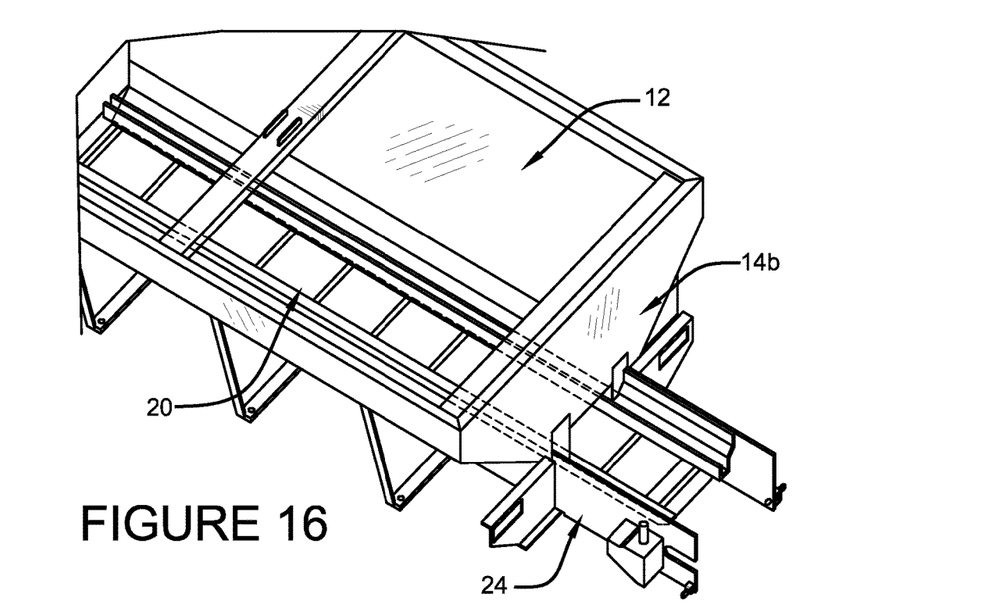
FIG. 16 is a view of the conveyor in the bottom of the hopper.

With reference to FIGS. 10 and 16, a material spreader hopper 10 is shown having a substantially v-shaped cross section. The hopper 10 comprises angled side walls 12 and front and rear walls 14a, 14b. Angled side walls 12 direct associated material down to a centrally located, longitudinal conveyor. The conveyor, best seen in FIGS. 2B and 3, directs material towards the rear of the hopper 10 by means of powered chain drive. It will be understood that the conveyor may be driven by any appropriate drive mechanism suitable for moving material deposited on the conveyor toward the rear wall 14b of the hopper 10.

Figure 1:
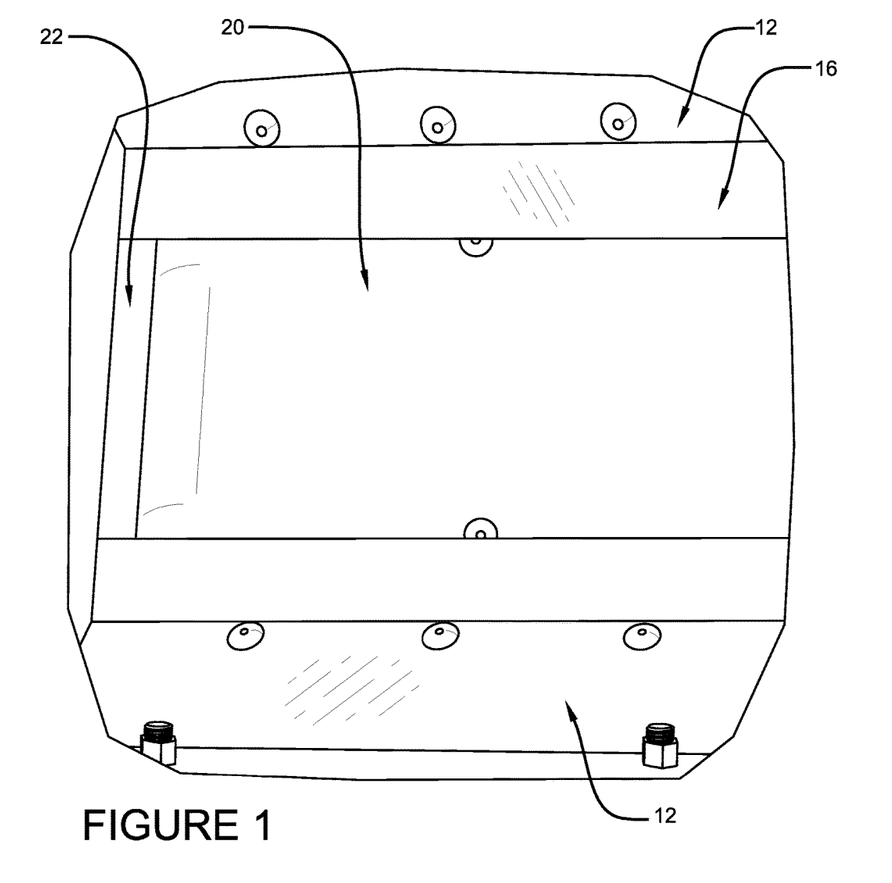
FIG. 1 is an overhead view of a conveyor belt of the present device.

With reference to FIG. 1, the forward most portion of the hopper 10, adjacent front hopper wall 14a, can have an entry point for the conveyor 20 with a gasket 22 to prevent material from passing through the conveyor entry point. According to one embodiment, the gasket 22 can be made from rubber, PVC, thermoplastic elastomers, other plastics, or any other suitable material selected with sound engineering judgement.

With reference to FIG. 16, the rearward most portion of the hopper 10, extending beyond rear hopper wall 14b may have an extension 24 which can contain or support the rearward end of conveyor 20, as well as various components of the conveyor 20, such as the drive mechanism.

With reference to FIG. 1, the edges of conveyor 20 extend horizontally beyond the inner most edge of the angled sides 12 of the hopper 10. The overlap of these edges serves to reduce the amount of material lost laterally from the conveyor 20 surface during operation. Additionally, mounted to the inner most edge of the angled sides 12, there may be included gaskets 16 extending longitudinally and substantially parallel with conveyor 20. These gaskets 16 may serve to further the overlap between conveyor 20 and angled sides 12 to further lessen the amount of material lost or otherwise displaced into the working components of the conveyor 20 during operation. According to one embodiment, the gaskets 16 can be made of rubber, PVC, thermoplastic elastomers, other plastics, or any other suitable material selected with sound engineering judgement.

As material is conveyed along the conveyor 20, first within the hopper and then exiting out through an opening provided in the rear wall 14b of the hopper 10, which, in one embodiment, may be selectively closeable by means of a feed gate or gate check, the material then falls through a spreader chute 30 and onto a spinner which rotates with sufficient speed to broadcast the material out and away from the rear of the vehicle.

Figure 2A:
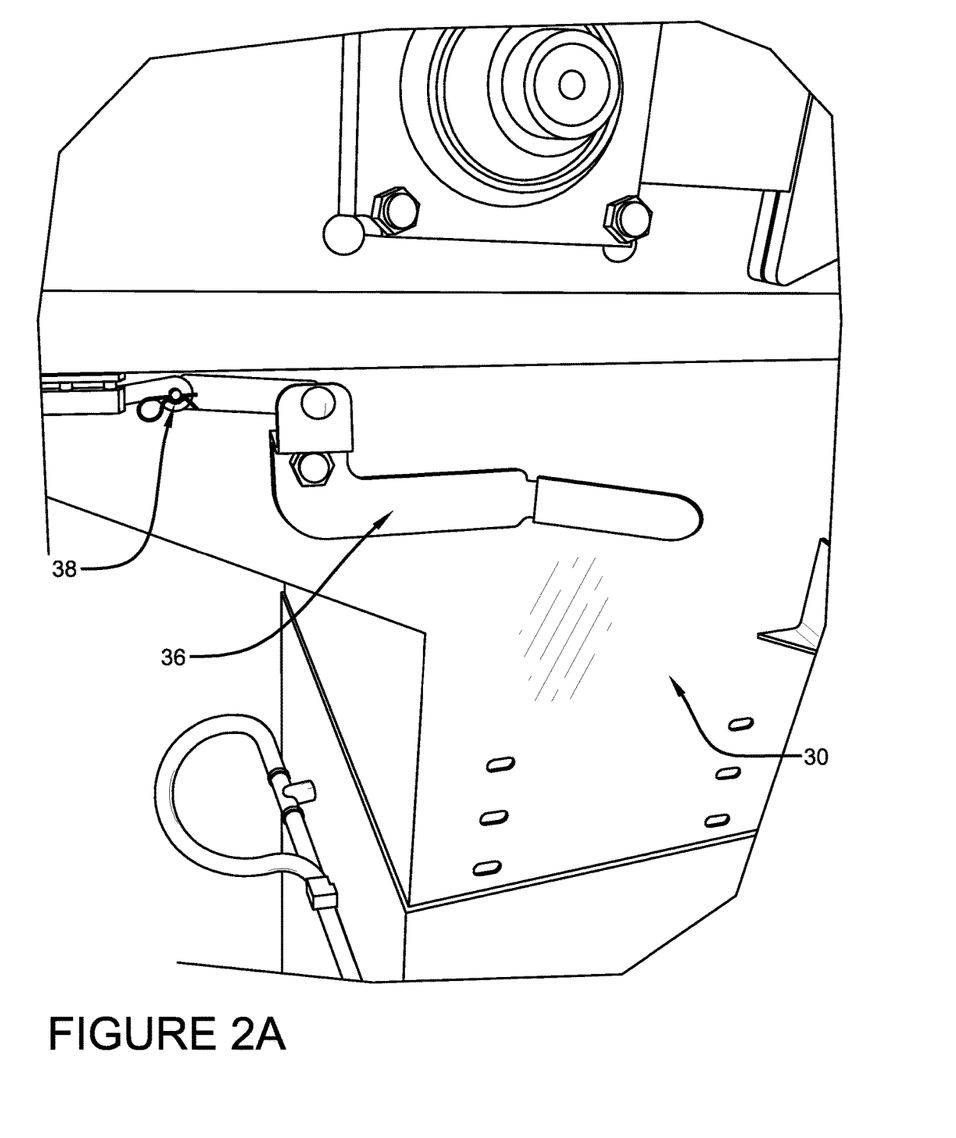
FIG. 2A is side view of a quick release latch on the spreader chute.
Figure 2B:
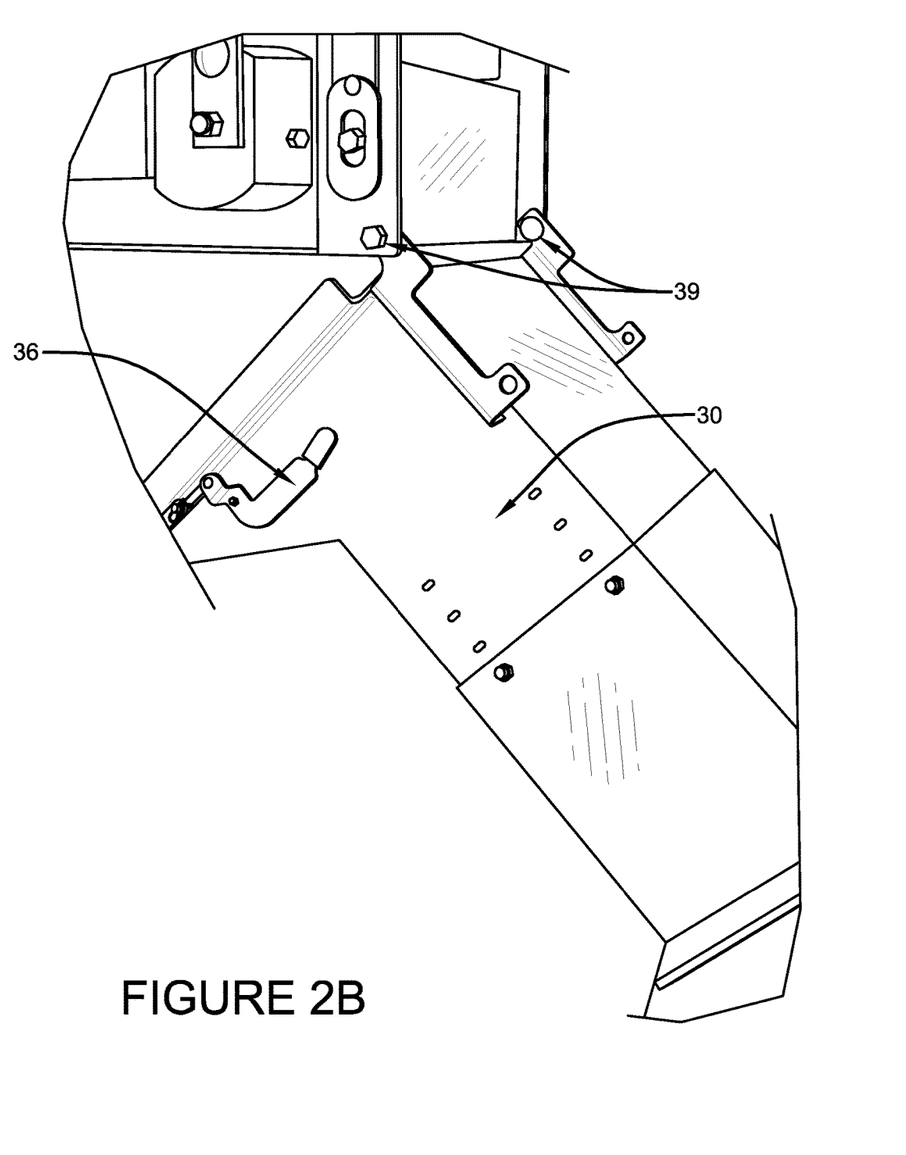
FIG. 2B is a side view of the spreader chute in a released position.

With continued reference to FIGS. 2A and 2B, according to one aspect of the present disclosure, the spreader chute 30 can have a quick release latch mechanism comprising a handle 36 and latch pin 38 which can release the forward most portion of the chute 30 from the rest of the material spreader as shown in FIG. 2B. Once released, the chute 30 can rotate rearwards and upwards about a pivot point 39 common with a frame structure positioned above or around the conveyor terminus and attached to the vehicle or hopper, to move the chute from an operation position to a storage position. This can allow the chute 30 and spinner to be up away from the road surface while the vehicle is travelling but not actively spreading materials.

Figure 3:
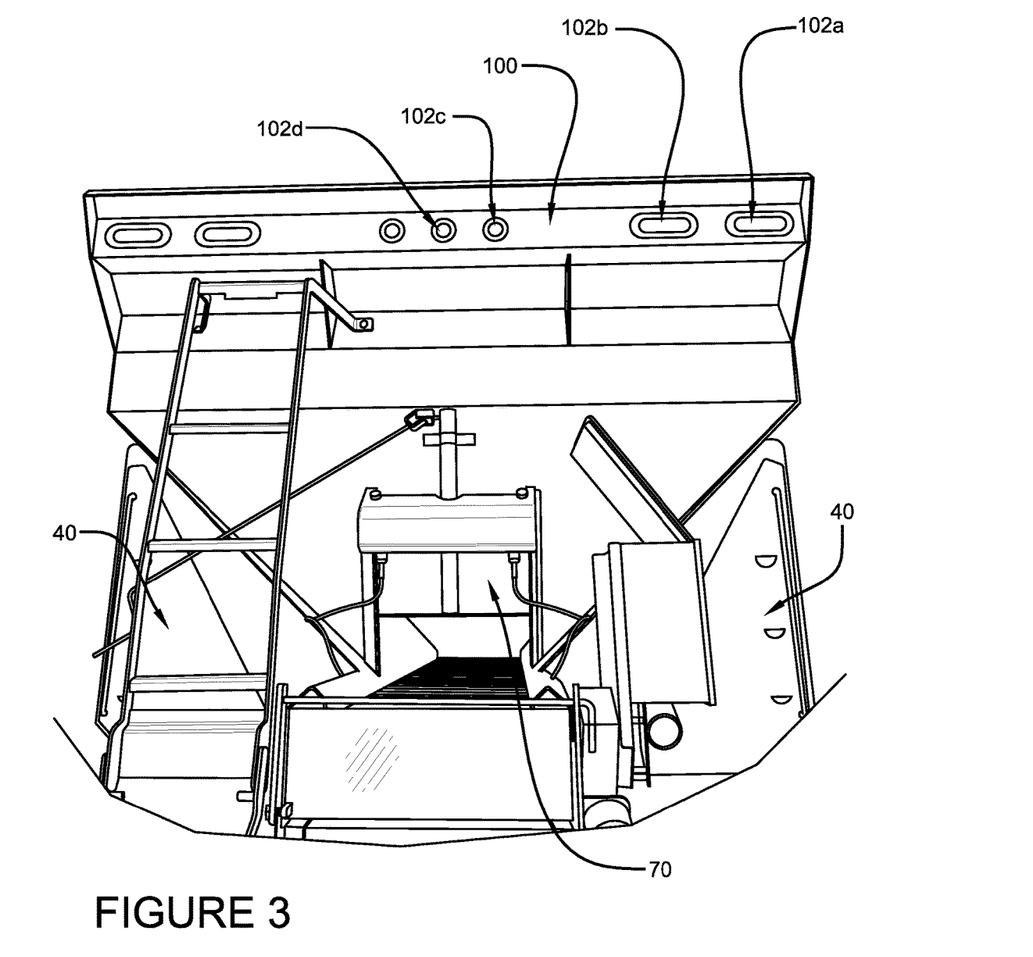
FIG. 3 is full view of the reward end of the truck and material spreader.
Figure 4:
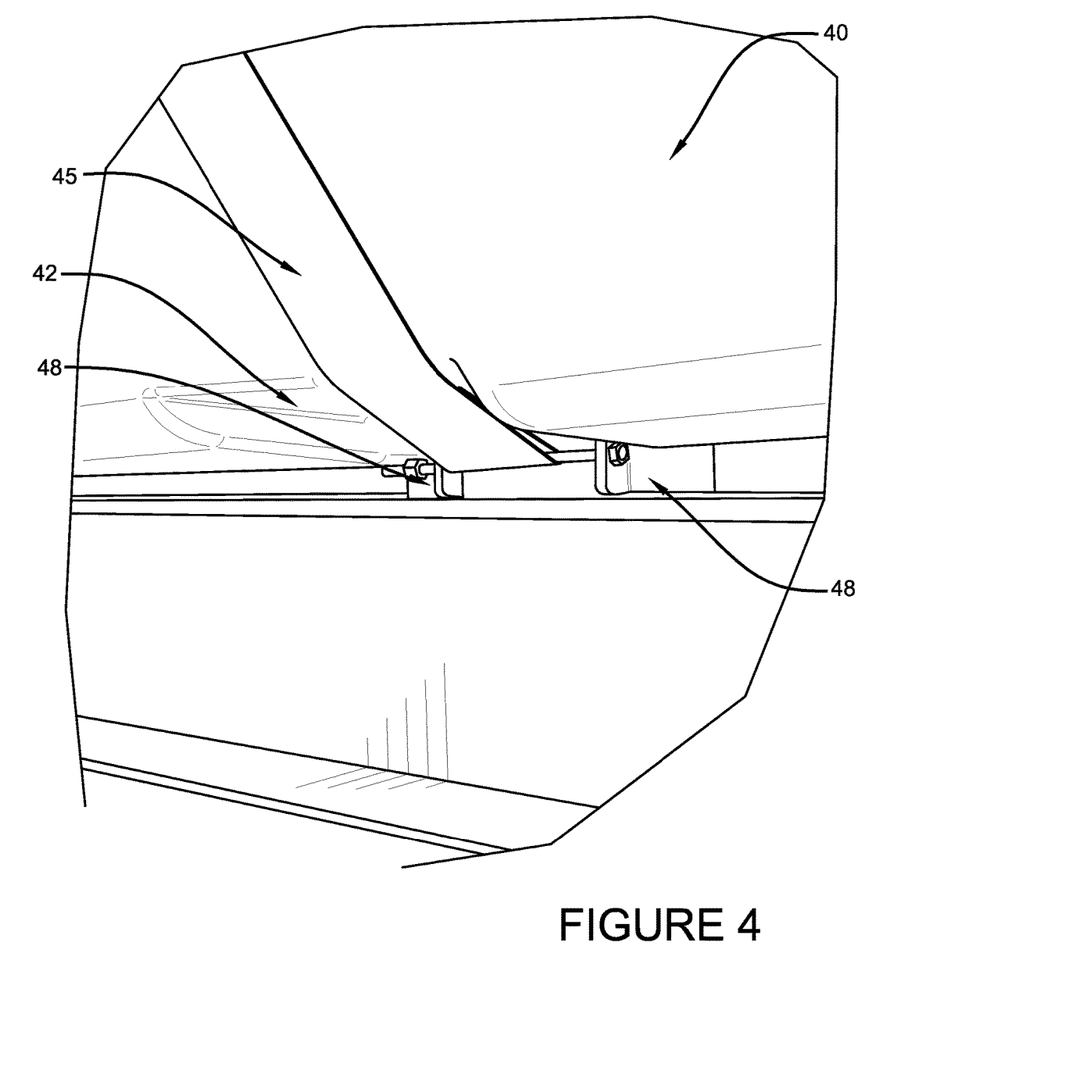
FIG. 4 is a close up view of a portion of the liquid storage tank securement system.

With reference to FIGS. 3-4 the material spreader of the present disclosure can also include one or more liquid storage tanks 40 associated with a separate liquid sprayer or delivery system. The liquid material delivery system of the present disclosure can include storage tanks 40 that can be molded out of a polymeric material or other suitable materials. Further, the present storage tanks 40 can include recessed areas 42 to interact with an improved liquid storage tank securement system. In prior art devices, liquid tanks sat on a tank pan, which consisted of a sheet of steel or other suitable metal. This pan supported the floor of the storage tank, was heavy, cumbersome, and over time the sharp edges of the pan tended to cut into the storage tank, causing their eventual failure. The present storage tanks 40 may be formed as a single piece, and the new securement system described herein eliminates the need for a pan. The securement system may comprise a series of one or more straps 45 which connect on each end to a c-shaped cross member 48, which is in turn mounted to the frame of the vehicle. One c-shaped member may be located below the storage tank and a second c-shaped member may be located above the storage tank. These c-shaped cross members 48 may have rounded edges, and the exposed face of the steel cross members faces away from the tank. As shown in FIG. 4, one example of a c-shaped cross member 48 shows the two arms of the c-shaped member extending outwardly from the vehicle frame. The connecting portion of the c-shaped member may be affixed to the vehicle frame by any means selected with sound engineering judgement. Each arm extending outward includes a hole through which a pin or bolt may extend, thereby securing the end of the strap at shown. Thus, the storage tank is mounted on a smooth, rounded edge and rests on the frame of the chassis. This eliminates the weight and the sharp edges of the pan. Further, as the straps 45 are connected to the c-shaped cross members and secured in grooves 42 on the exterior of the tank, there is not intrusion into the tank by mounting hardware which eliminates a source of leaks and corrosion. The recessed grooves of the tank also serve to prevent slipping of the straps and protect the straps from abrasions and cuts as the straps are below the outer surface of the tanks. A further benefit of the new securement system lies in the reduced weight and increase space resulting from elimination of the pan. This allows for the storage tanks to have increased liquid capacity while taking up less of the overall footprint of the vehicle.

Figure 5:
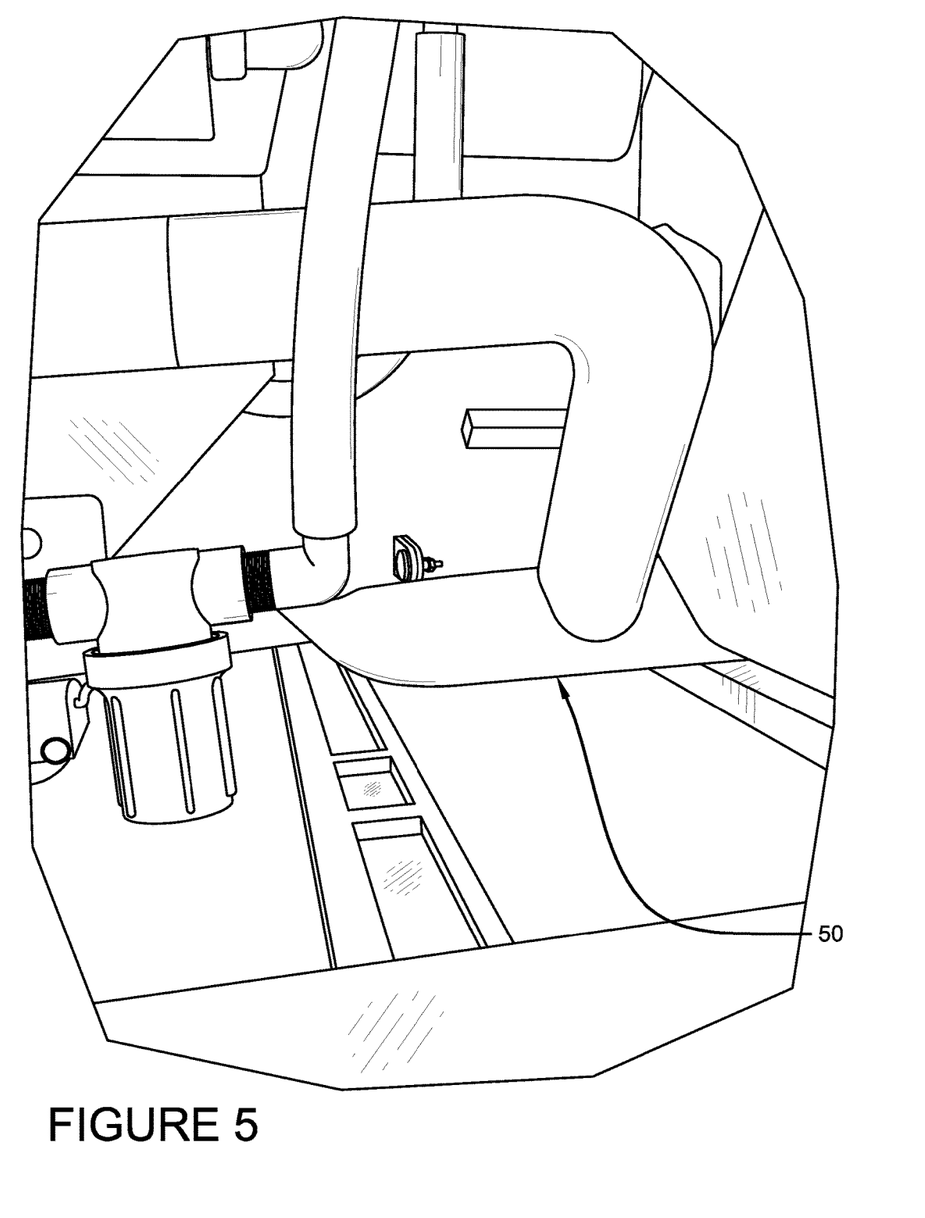
FIG. 5 is a view of the cross over hose.

With reference to FIG. 5 a new feature of the liquid delivery system is the use of a single piece, molded, silicone cross over hose 50. This cross over hose 50 eliminates the need for traditional fittings, elbows, nipples, and the like which were frequent sources of leaks and failures of prior liquid delivery systems. The new hose can be molded from a single continuous piece of reinforced silicone and can connect directly to both tanks and to the standard quick fill mechanisms used in the industry. Eliminating the need for these couplers reduces the amount of maintenance needed on the system as well.

Figure 6:
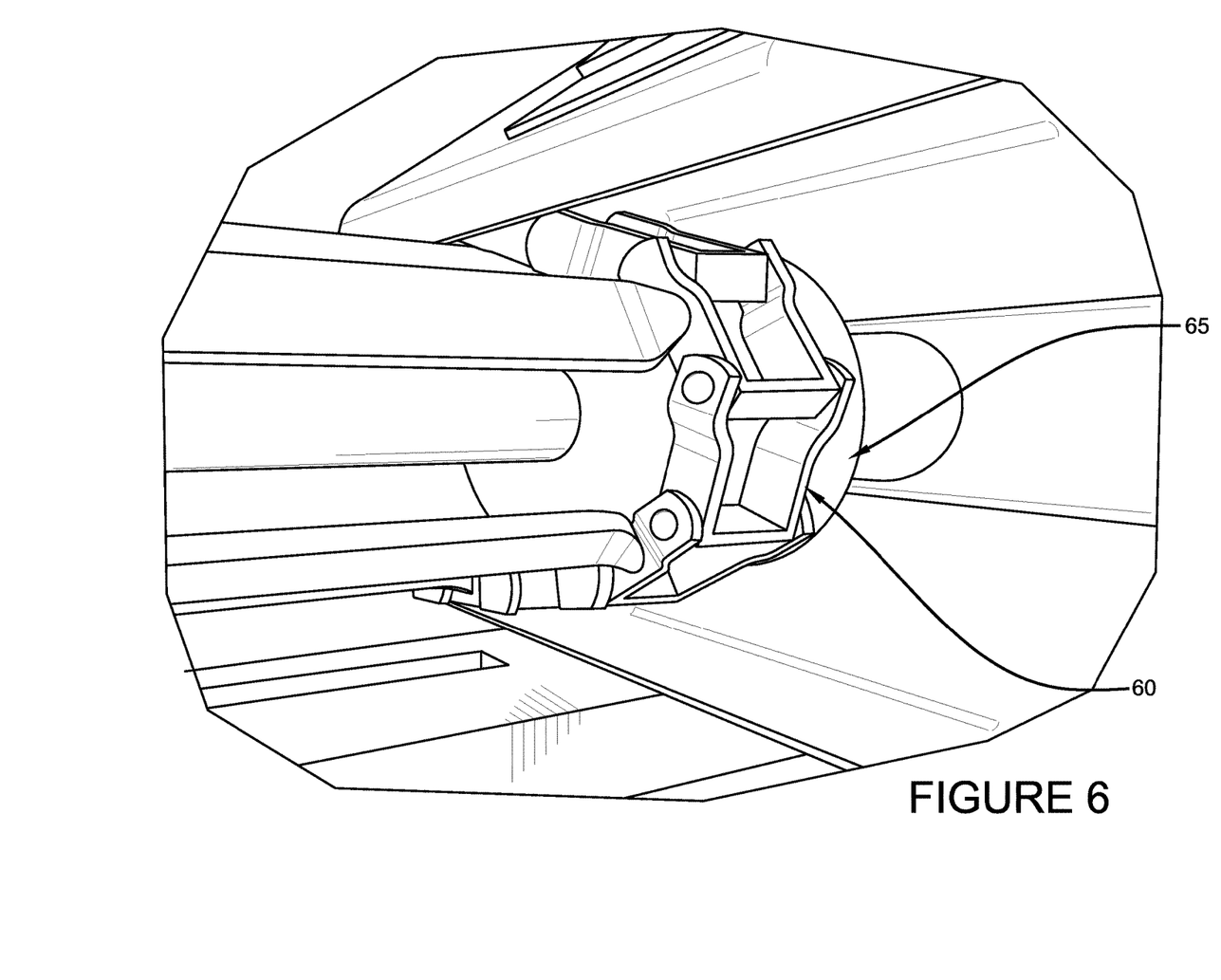
FIG. 6 is a view of the forward end of the conveyor chain.
Figure 7:
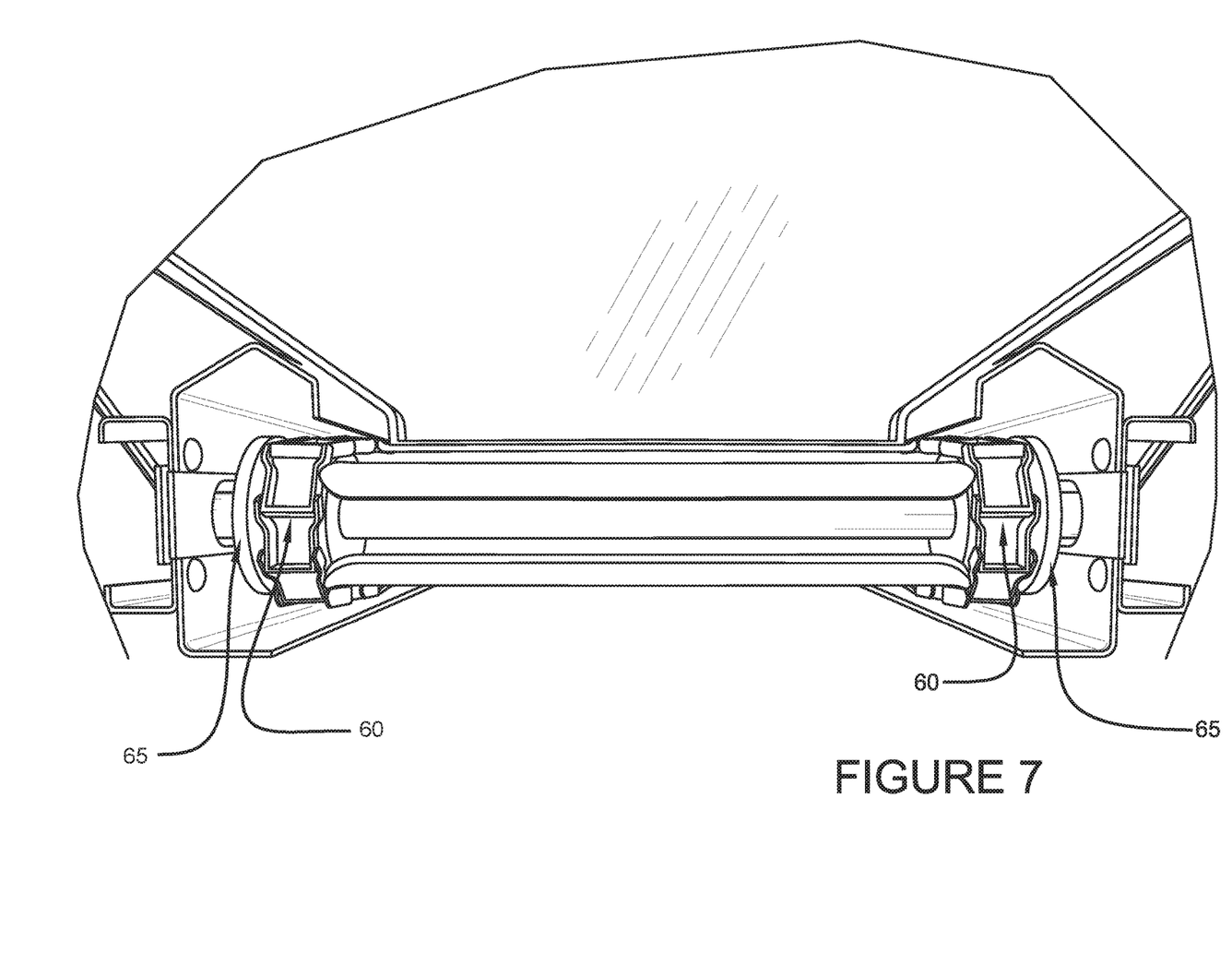
FIG. 7 is a full view of the forward end of the conveyor.

With reference to FIGS. 6-7, the conveyor 20 can be driven by a chain drive wherein a chain 60 on either edge of the conveyor can be disposed in a continuous loop. At each end of the conveyor, the chain can rotate around a fixed bearing 65 which can allow for smooth and uninterrupted operation. According to the present disclosure, these bearings can be disposed on each chain at each end of the conveyor and can be constructed from Ultra High Molecular Weight Polyethylene ("UHMWPE"). Using UHMWPE for these bearings reduces maintenance costs as they are self-lubricating, contain no moving parts, and do not require regular maintenance.

Figure 8:
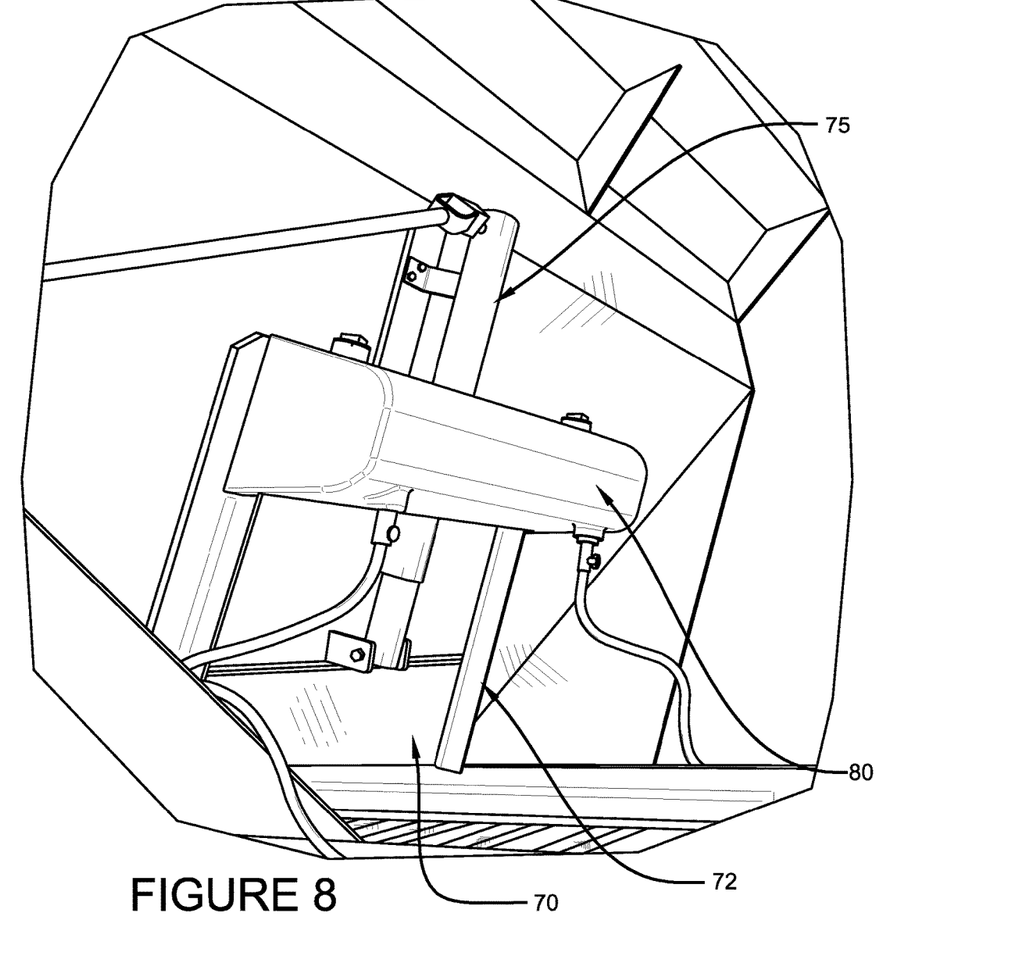
FIG. 8 is a close up view of the oil box and feed gate.
Figure 9:
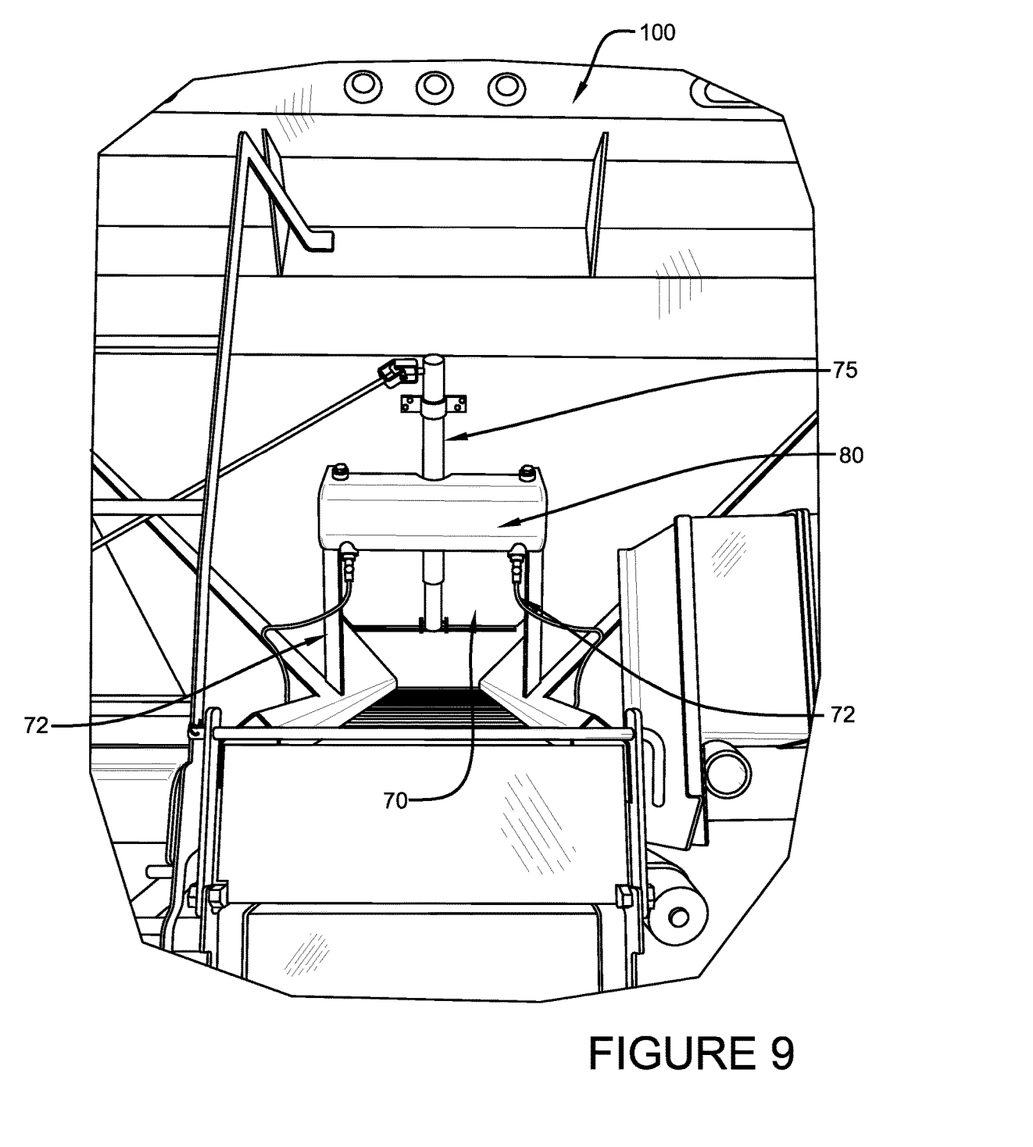
FIG. 9 is a full view of the rearward end of the conveyor.

With reference to FIGS. 8-9, where the conveyor 20 exits the rearward portion of the hopper 10, the flow of material can be controlled through use of a feed gate or gate check 70. The feed gate 70 can be raised or lowered to change the aperture of the exit opening size to increase or decrease the flow of material accordingly. The side edges of the feed gate may ride in respective grooves 72 formed or otherwise affixed to the exterior of the hopper wall 14b. Previously used feed gates tend to suffer frequent malfunctions, namely that the gate itself has a tendency to jam or be difficult to move. According to one aspect, the grooves 72 in which the feed gate travels can be lined with material to facilitate smooth motion. According to one aspect, these grooves can be lined with UHMWPE, which is known to be highly resistant to abrasion while maintaining a very low coefficient of friction and is also known to be self lubricating. The feed gate 70 can be controlled by use of a handle 75 that can be hingedly connected to the top of the feed gate and extend therefrom.

With continued reference to FIGS. 8-9, an oil box 80 can be positioned above the check gate 70. This positioning of the oil box 80 reduces the space used to mount the oil box 80 and frees up space on the rear of the vehicle for other accessories and equipment.

Figure 11:
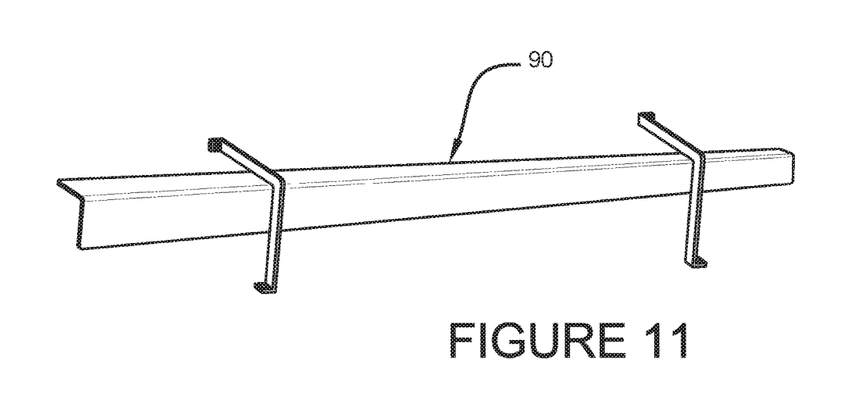
FIG. 11 is a view of the conveyor cover.

With reference to FIGS. 10-11, the hopper 10 can include an "inverted V-shaped" cover 90 over the top of, and extending the length of, the conveyor 20. This cover 90 can allow material to be piled in the hopper above the conveyor, without hindering the operation thereof. Furthermore, the cover 90 can provide additional longitudinal strength to the hopper and serves to move the center of gravity of the hopper to the middle of the vehicle chassis, thereby increasing stability of the system.

With reference to FIGS. 3 and 9, the material spreader, particularly when used on heavy duty vehicles, necessarily needs to include a light bar for rear facing lights, such as brake lights, hazard lights, and/or turn signals. Often such lighting is required due to national, state, or local ordinances and traffic safety rules. The present disclosure integrates these lights into the body of the spreader itself. In particular, a light bar 100, including lights for braking, turn signals, running lights, and hazard lights 102a-d, is integrated into the spill shield mounted at the upper portion of the hopper. This gives high visibility to these lights and keeps them from obstruction during normal operation of the material spreader. Furthermore, the integration of the lights into the spill shield reduces maintenance and saves valuable space on the rear of the vehicle which can then be modified or otherwise equipped with additional features or equipment.

Figure 12:
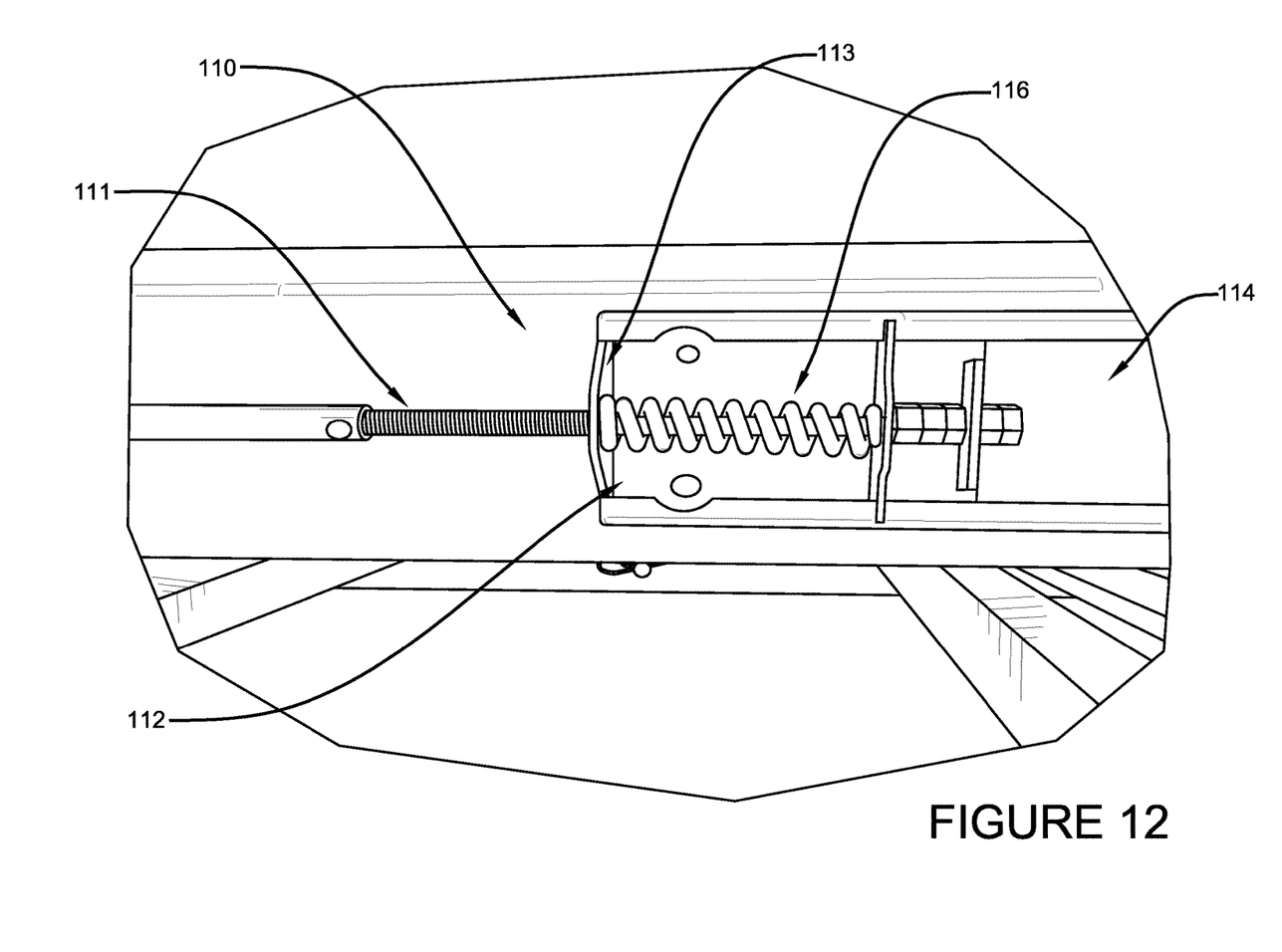
FIG. 12 is a view of the chain tensioner plate.
Figure 13:
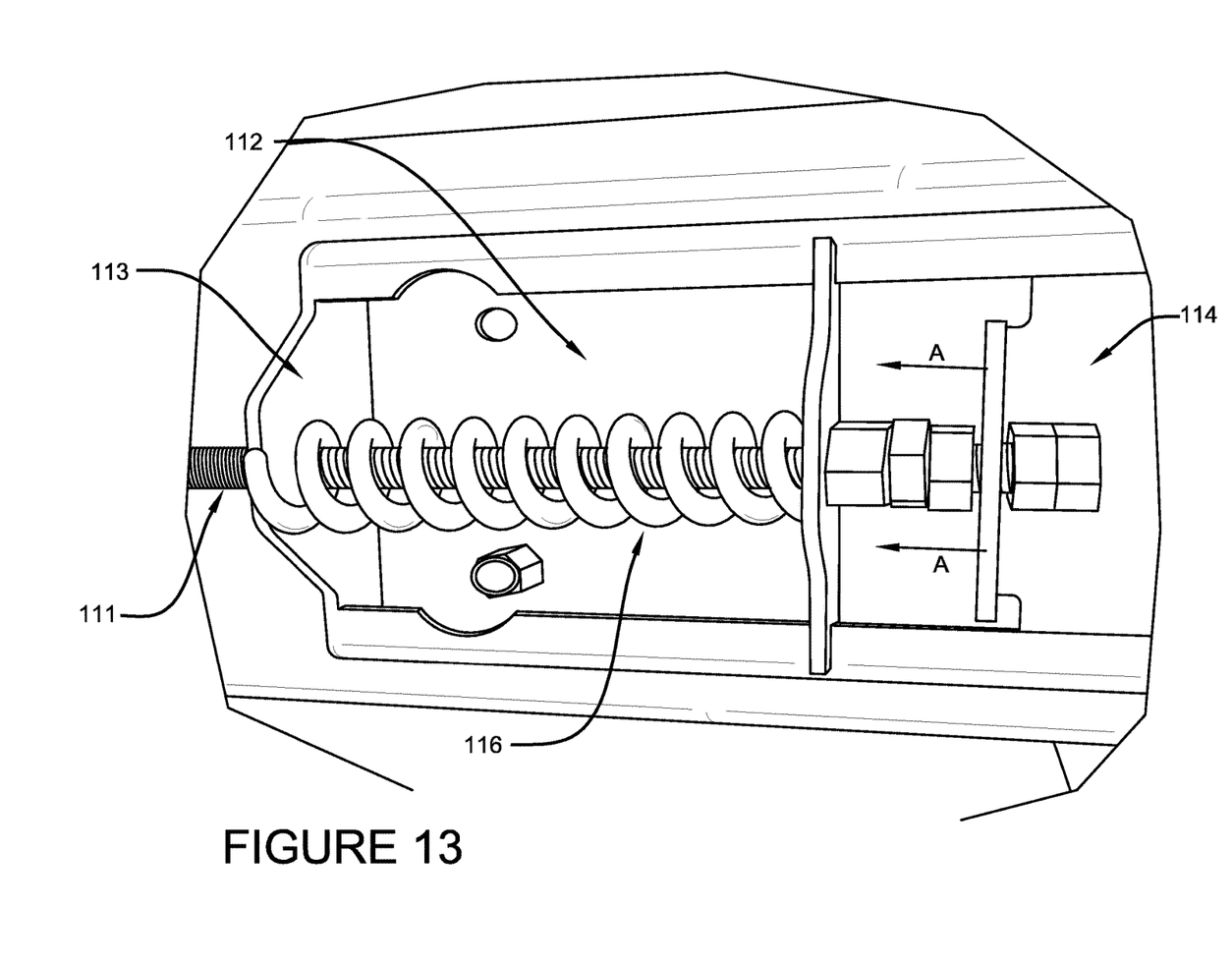
FIG. 13 is a close up view of the chain tensioner plate.
Figure 14:
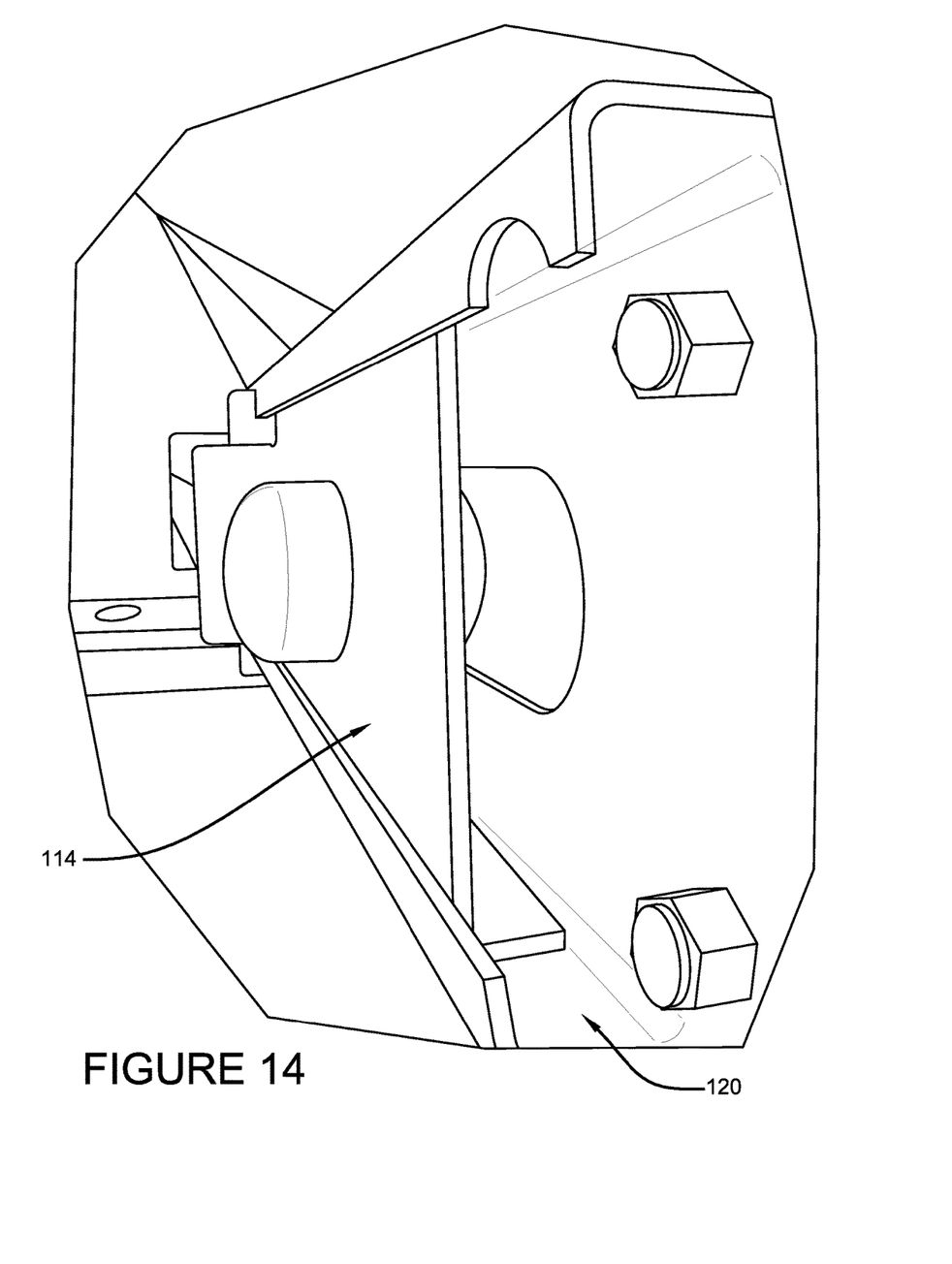
FIG. 14 is a close up perspective view of the chain tensioner plate.
Figure 15:
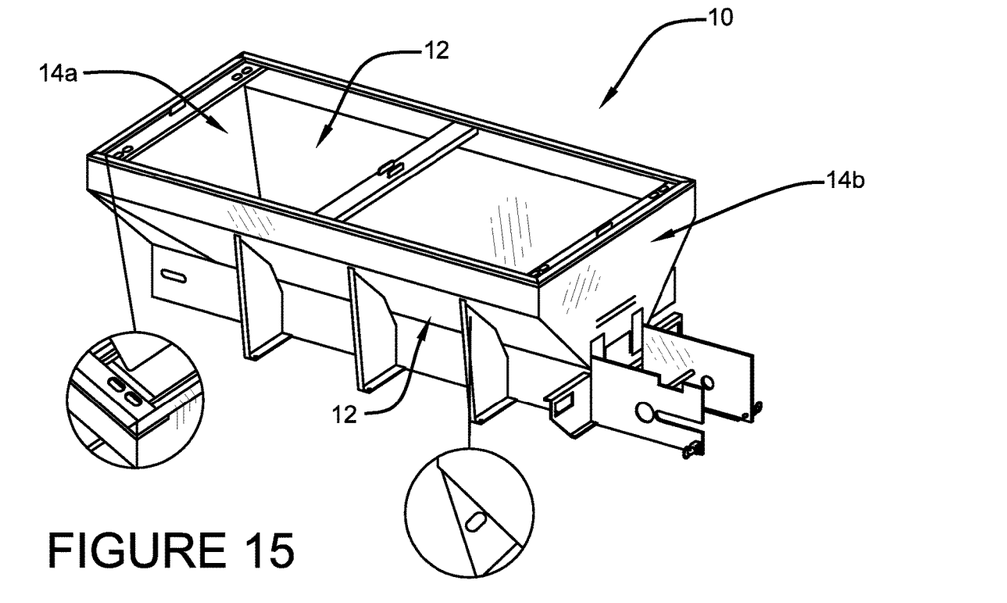
FIG. 15 is a view of a hopper.

With reference to FIGS. 12-14, the material spreader can have a chain tensioner system 110 disposed on the body of the spreader. The chain tensioner system 110 may be used to increase or decrease tension on the conveyor 20. The chain tensioner system 110 comprises a threaded rod 111, fixed tensioner plate 112, movable tensioner plate 114 and spring 116. As depicted most clearly in FIGS. 13 and 14, threaded rod 111 passes through the front wall 113 of fixed tensioner plate 112 and spring 116. The end of the threaded rod 111 is connected to movable tensioner plate 114, which moves in channel 120, which may be a channel formed in the fixed tensioner plate. Movable tensioner plate is operatively connected to the conveyor to increase tension in the conveyor chains when the movable tensioner plate is drawn in a direction shown by the arrows. According to one aspect, the chain tensioner system 110 can comprise components allowing for the system to be retrofitted to be installed on preexisting material spreaders. The movable chain tensioner plate can have a forward most portion that can be constructed from a single piece of steel that moves along channel 120.

We claim:

1. A material spreader apparatus for a heavy duty vehicle, the apparatus comprising:
   a. a hopper,
   b. a conveyor disposed longitudinally within the hopper and having a portion extending through an end wall of the hopper to the exterior of the hopper, and
   c. a chute disposed below the extending portion of the conveyor, the chute having an upper portion that is pivotably attached to a frame structure, the chute further comprising a quick release latch mechanism comprising a handle operatively connected to a latch pin, wherein the handle is selectively movable from a first position wherein the latch pin engages the frame structure to retain the chute below the frame structure and a second position wherein the latch pin releases from the frame structure allowing the chute to pivot upward from the frame structure.

2. The material spreader apparatus of claim 1, further comprising a pivot point for allowing the chute to pivot upward, wherein the pivot point is common with the frame structure positioned at a conveyor terminus and attached to one of the vehicle or the hopper.

3. The material spreader apparatus of claim 1, further comprising a powered chain drive for driving the conveyor to direct material towards a rear of the hopper.

4. The material spreader apparatus of claim 3, wherein the chain drive comprises chains on either edge of the conveyor disposed in a continuous loop.

5. The material spreader apparatus of claim 3, further comprising a chain tensioner system for selectively increasing and decreasing tension on the conveyor chains.

6. The material spreader apparatus of claim 5, wherein the chain tensioner system comprises a threaded rod, a fixed tensioner plate, a movable tensioner plate, and a spring, such that the threaded rod passes through a front wall of the fixed tensioner plate and the spring, and wherein an end of the threaded rod is connected to the movable tensioner plate which moves in a channel formed in the fixed tensioner plate, wherein the movable tensioner plate is operatively connected to the conveyor to increase tension in the conveyor chains.

7. The material spreader apparatus of claim 1, further comprising an exit opening in the end wall of the hopper along the conveyor, selectively closeable by a feed gate, wherein the feed gate is raised and lowered to change an aperture of the exit opening size to respectively increase and decrease the flow of material from the hopper.

* * * * *